United States Patent
Akkermans

(10) Patent No.: US 6,314,065 B1
(45) Date of Patent: Nov. 6, 2001

(54) OPTICAL SCANNING APPARATUS FOR A MULTI-LAYER RECORD CARRIER, INCLUDING A FOCUS CONTROL CIRCUIT

(75) Inventor: Antonius H. M. Akkermans, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/583,100

(22) Filed: Mar. 26, 1998

Related U.S. Application Data

(63) Continuation of application No. 08/688,481, filed on Jul. 30, 1996, now Pat. No. 5,757,744.

(30) Foreign Application Priority Data

Jul. 31, 1995 (EP) .................................................. 95202084

(51) Int. Cl.[7] ....................................................... G11B 7/00
(52) U.S. Cl. .................................. 369/44.25; 369/44.76; 369/53.23
(58) Field of Search .................................... 369/44, 44.25, 369/44.29, 44.26, 53.23, 53, 28

(56) References Cited

U.S. PATENT DOCUMENTS 5,414,682 * 5/1995 Iida ........................................ 369/94

* cited by examiner

Primary Examiner—Nabil Hindi
(74) Attorney, Agent, or Firm—Michael E. Belk

(57) ABSTRACT

An optical beam (8) in a scanning device is focused on an information layer (3) of a multi-layer optical record carrier. A focus control circuit (22) keeps the focal point (9) of the beam on the information layer. When the focal point jumps to another information layer, the focus control circuit does not monitor the so-called central aperture signal in order not to depend on the presence of information in the information layers. During the jump the characteristics of the feedback loop of the focus control unit are modified to avoid instabilities in the movement of the focal point during the jump. When the focal point is captured on the designated information layer, the characteristics of the feedback loop are restored.

16 Claims, 4 Drawing Sheets

Figure 1:
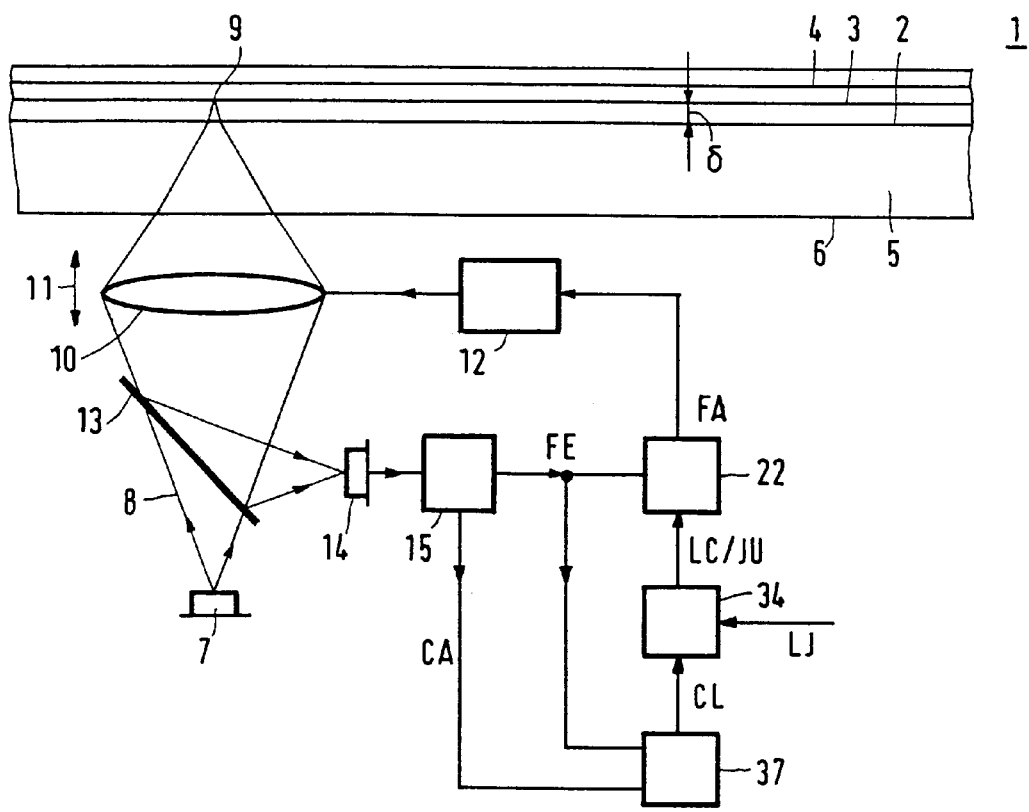

OPTICAL SCANNING APPARATUS FOR A MULTI-LAYER RECORD CARRIER, INCLUDING A FOCUS CONTROL CIRCUIT

This application is a Continuation of Ser. No. 08/688,481 filed Jul. 30, 1996, now U.S. Pat. No. 5,757,744.

The invention relates to an optical scanning apparatus for scanning an optical record carrier having at least a first and second superjacent information layers, comprising an optical system including means for focusing a radiation beam to a focal point, a focus actuator for controlling the focusing means to shift the focal point in a direction perpendicular to the layers, a focus error detector for deriving a focus error (FE) signal indicative of the direction and distance between the focal point and the layer to be scanned, a focus control circuit for deriving a focus actuator drive signal in response to the FE signal and supplying said drive signal to the focus actuator to cause the actuator to maintain the focal point substantially on the layer to be scanned, a first controller for generating a binary loop-control signal which assumes a first logical value controlling a modification of the characteristics of the focus control circuit after receiving a layer-jump command for changing the scanning from the first to the second layer and a second logical value controlling the restoring of the characteristics after receiving a transition of a binary close signal.

An optical record carrier may comprise several information layers to increase its storage capacity. These layers may be scanned by a single optical beam which is brought to a focal point by means of an objective lens. A focus control circuit keeps the focal point on an information layer, the circuit controlling the position of the objective lens in response to a focus error signal, which represents the deviation of the focal point from the information layer. The focus error signal is derived from the radiation reflected or transmitted from the record carrier and intercepted by a photo-detection system. The radiation from the record carrier is also used to generate a so-called central aperture (CA) signal, which is a measure for the total amount of radiation reflected by the record carrier. The CA signal may be used to form an information signal representing the information read from the record carrier.

When a scanning apparatus starts a scanning session, it must move the objective lens towards the record carrier. During this movement, the focal point crosses the so-called entrance plane of the record carrier, a low-reflection boundary surface of a substrate of the record carrier through which the information layers are scanned. In order to avoid the focal point to lock on the entrance plane, the focal control circuit checks the amplitude of the CA signal. When the amplitude due to the entrance plane is below a certain level, the circuit will not lock the focal point on the entrance plane, and continue moving the objective lens towards the record carrier. When the focal point approaches the information layer of the record carrier, the high reflection of this layer will cause the CA signal to cross said level, and the focus control circuit will lock the focal point on the information layer.

The European patent application nr. 0 020 199 discloses a scanning apparatus comprising a focus control circuit for changing the focal point between two information layers of an optical record carrier. When changing to another information layer, the feedback loop of the focus control circuit is opened, the actuator is driven in the appropriate direction, and the level of the high-frequency content of the CA signal is monitored. When the amplitude of the high-frequency content crosses a certain level, the focal point is close to the information layer, and the feedback loop is closed. The focus control circuit then takes care that the focal point follows the information layer.

A disadvantage of the know scanning apparatus is, that the changing the focal point between layers does not operate anymore if one or both layers have not (yet) been provided with information. Since in that case the CA signal does not comprise the high-frequency content, said level will not be crossed and the feedback loop will not be closed.

It is an object of the invention to provide an optical scanning apparatus that can reliably focus on all information layers of an optical record carrier, whether the layers contain any information or not.

The scanning apparatus according to the invention is thereto characterized in that the optical scanning apparatus comprises a second controller for generating the close signal in response to the FE signal and comprising an inhibitor for inhibiting the transition of the close signal in an interval around a zero-crossing of the FE signal in between subsequent zero-crossings corresponding to the information layers. It has turned out that a layer jump can be realized reliably by only monitoring the FE signal, which is not affected by the presence or absence of information contained in the information layers. This is in contrast with the known focus control circuits, which use both the FE signal and CA signal. When using only the FE signal, a special precaution must then be taken when moving the focal point from one layer to the other. If the feedback loop of the focus control circuit were to be kept closed when changing to another information layer, the actuator would acquire too much speed around the zero-crossing of the FE signal situated in between two information layers. As a consequence, the actuator might shoot over the designated information layer. The apparatus according to the invention solves the problem by opening the feedback loop or part of it in an interval around said zero-crossing, thereby avoiding the undue speed increase.

An important contribution to the speed increase comes from the differentiating branch in the feedback loop due to the slope of the FE signal around said zero-crossing. The part of the feedback loop to be opened is therefore preferentially the differentiating branch. The other two branches of the feedback loop, i.e. the proportional and integrating branch, can, to a certain extent, control the speed of the actuator during the jump in response to the motion of the record carrier.

In another embodiment of the apparatus according to the invention, all branches of the feedback loop are opened during a jump. The motion of the actuator during the jump can then be controlled independently from the motion of the record carrier.

A preferred embodiment of the scanning apparatus according to the invention is characterized in that the inhibitor comprises a comparator for detecting upward crossings of a preset level by the absolute value of the FE signal, and the second controller generates the transition of the close signal after the $2N^{th}$ upward crossing after the layer-jump command. When subsequent information layers have subsequent ordinal numbers, then N is the absolute difference in ordinal number between the first and second information layer. The FE signal has generally the shape of the known S-curve, having a zero value when the focal point is far removed from an information layer and when the focal point is located on the information layer, and with a different sign on both sides of the information layer. When the focal point is moved through the information layers, each layer will give rise to an S-curve. The closeness of the neighbouring S-curves causes the emergence of a clear zero-crossing of the FE signal in between two information layers. The comparator detects when the absolute value of the FE signal crosses the preset level from a value below to a value above the preset below. Such a crossing is called an upward crossing. The first upward level crossing after start of the layer jump belongs to the S-curve of the information layer the focal point has just left. If the feedback loop were to be closed on the first upward crossing, as is common in the known scanning apparatuses, the focus control unit might drive the focal point back to the information layer it has just left. For a jump to a neighbouring layer the inhibitor according to the invention will allow that the feedback loop will only be closed after the $2^{nd}$ upward level crossing. The $2^{nd}$ upward level crossing occurs in the S-curve of the neighbouring information layer. When the loop is closed after this crossing, the focus control circuit will cause the focal point to move towards the designated neighbouring information layer.

The closing of the loop may be delayed after the detection of the $2N^{th}$ upward level crossing to provide a stable landing of the focal point on the designated information layer. The delay may be up to the first zero of the S-curve after the upward crossing, i.e. up to the moment the focal point passes the designated information layer. The scanning apparatus according to the invention is thereto characterized in that the FE signal has substantially a zero value when the focal point coincides with one of the layers, and the inhibitor comprises a zero-crossing detector for detecting zero-crossings of the FE signal, and the second controller generates the transition of the close signal substantially at the detection of the first zero-crossing of the FE signal occurring after the 2N upward crossings.

The delay may also be up to the first maximum of the S-curve after the upward zero-crossing, thereby allowing a longer deceleration before the focal point is on the designated information layer. The scanning apparatus according to the invention is then characterized in that the inhibitor comprises a zero-crossing detector for detecting zero-crossings of the derivative of the FE signal, and the second controller generates the transition of the close signal substantially at the detection of the first zero-crossing of the derivative occurring after the 2N upward crossings.

Instead of inhibiting the closure of the loop until the $2N^{th}$ upward crossing of the FE signal, the closure may also be inhibited by a timer. The timer must inhibit the closure at least to past the zero-crossing of the FE signal which precedes the zero-crossing appertaining to the designated layer. When the speed of the actuator during the layer jump and the distance between layers and the number of layers to jump is known, the duration of the inhibition can be calculated and this predetermined time can be programmed in the timer. In this embodiment, the scanning apparatus according to the invention is characterized in that the inhibitor comprises a timer for generating a binary timing signal having a transition after a predetermined time which depends on the absolute difference in ordinal number between the first and second information layer, and the second controller generates the transition in the close signal after the transition in the timing signal.

In the embodiment having a timer, a further delay after lapse of the predetermined time may be introduced before the feedback loop is closed. The further delay may be up to the detection of the first zero-crossing of the FE signal after the lapse of the predetermined time. The further delay may be also up to the detection of the first zero-crossing of the derivative of the FE signal.

These and other aspects of the invention will be apparent from and elucidated with reference to the embodiments described hereinafter.

In the drawings

Figure 2:
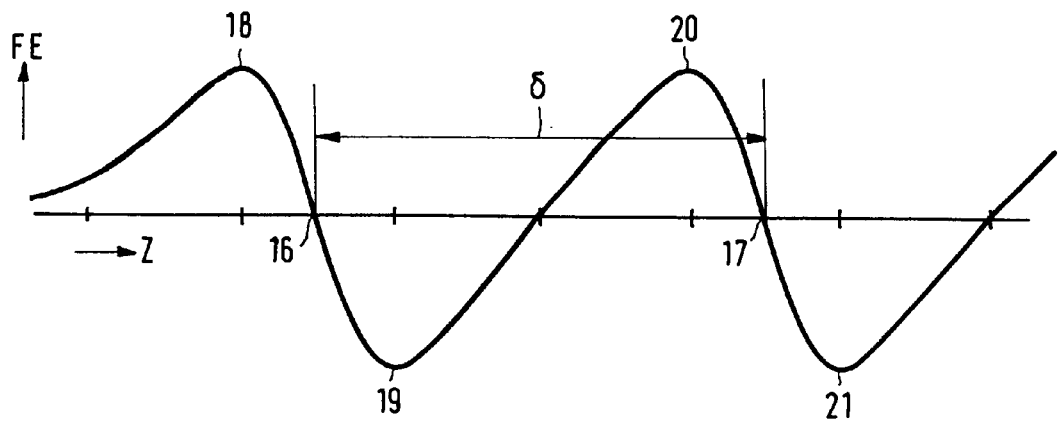
Figure 3:
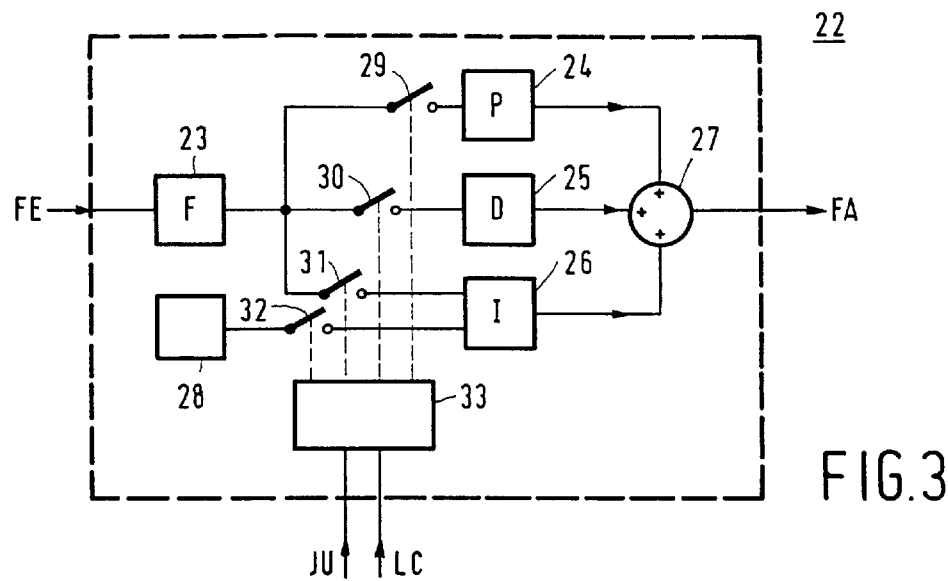
Figure 4:
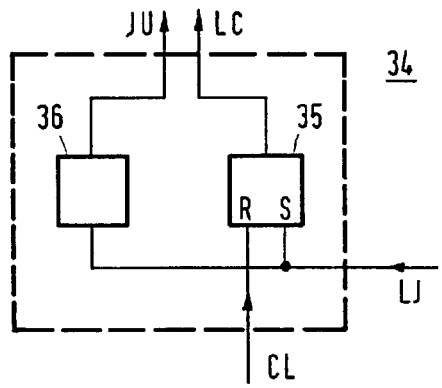
Figure 5:
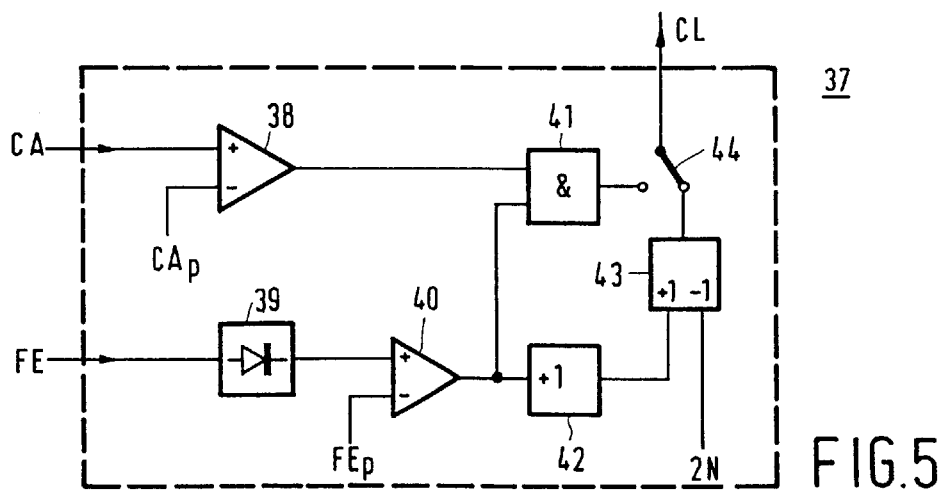
Figure 6:
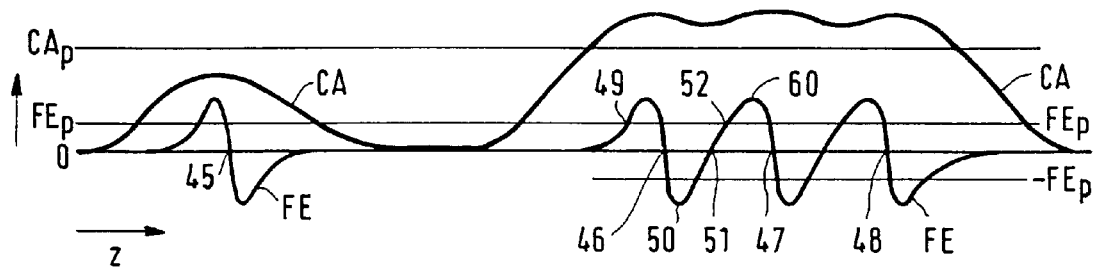
Figure 7:
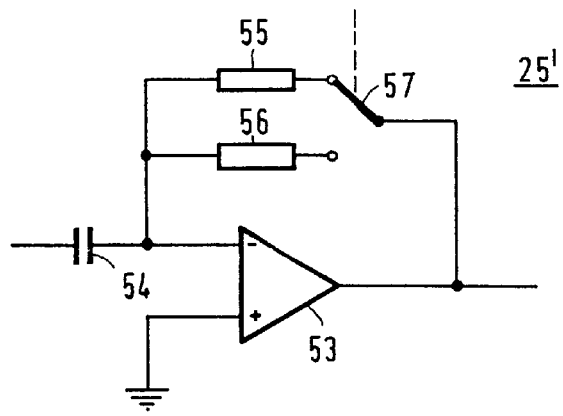
Figure 8:
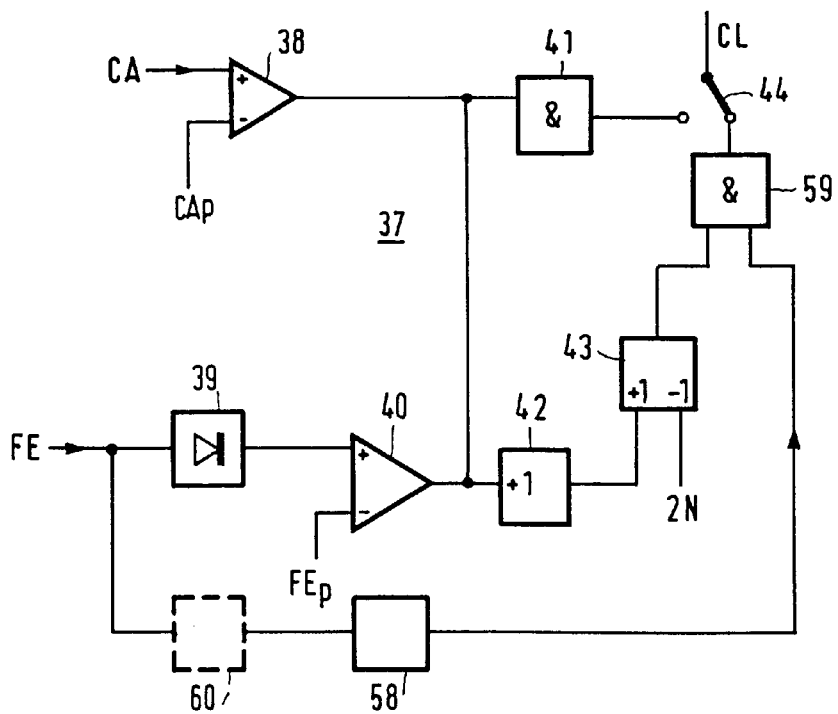
Figure 9:
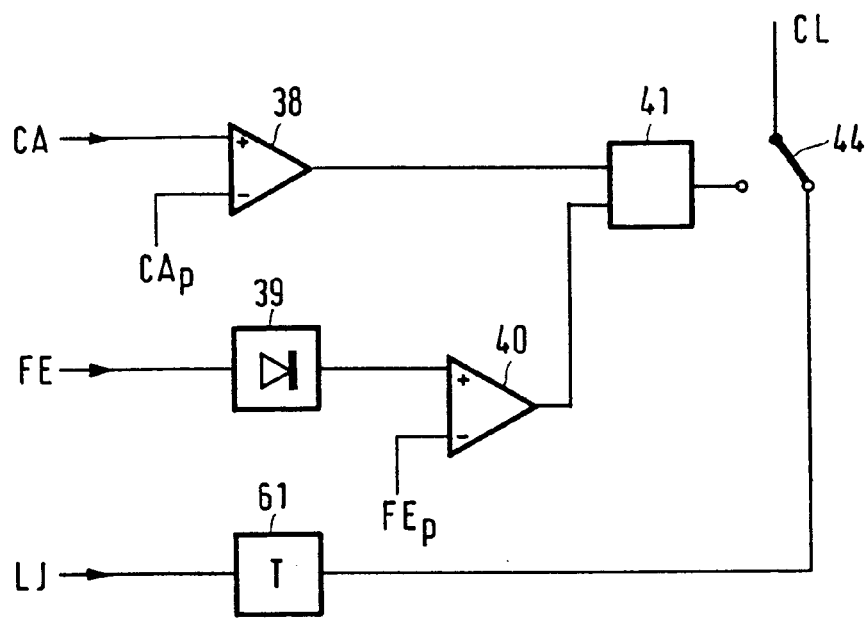
Figure 10:
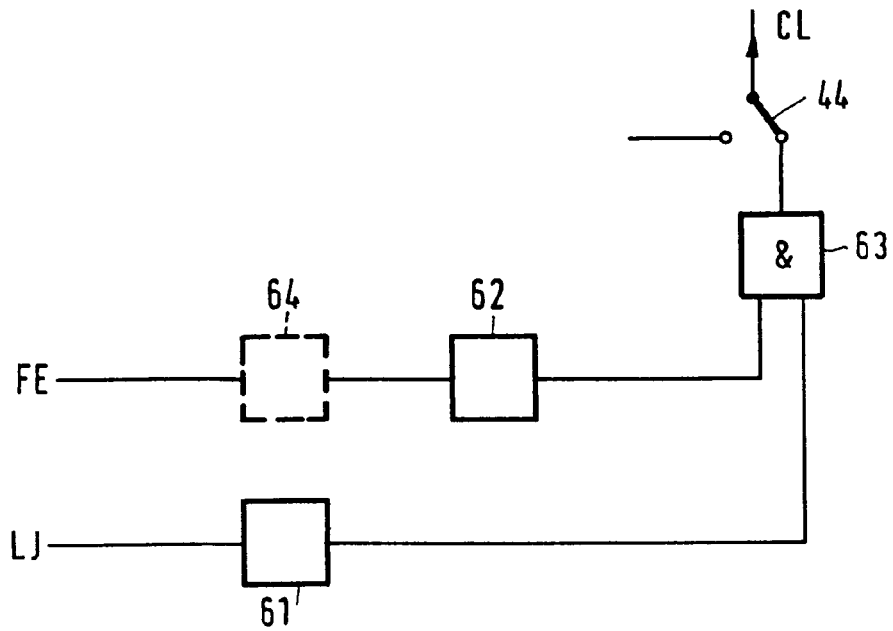

FIG. 1 shows schematically a scanning device according to the invention,

FIG. 2 shows the form of the focus error signal as a function of the position of the focal point, FIG. 3 shows schematically the focus control circuit, FIG. 4 shows an embodiment of the first controller, FIG. 5 shows an embodiment of the second controller, FIG. 6 shows the form of the focus error signal and the central aperture signal as a function of the position of the focal point, FIG. 7 shows an adjustable differentiator, FIG. 8 shows a second and third embodiment of the second controller, FIG. 9 shows a fourth embodiment of the second controller and FIG. 10 shows part of a fifth embodiment of the second controller.

Identical reference numerals in the different Figures denote identical elements.

FIG. 1 shows an optical scanning apparatus according to the invention for scanning an optical record carrier 1. The figure shows a cross-section of the record carrier, which has three superjacent information layers 2, 3, 4 each spaced by a distance δ. Each of the layers may be scanned separately through a transparent substrate 5, which has an entrance surface 6 forming a boundary between the environment and the record carrier. Information layers 2 and 3 are partially reflective in order to make the scanning of information layer 4 possible through layers 2 and 3. The information may be encoded in the information layers in the form of pits, bumps, areas having a reflection or magnetization different from the surrounding area. The record carrier may be disc shaped, rotatable around its centre or of rectangular shape.

The scanning apparatus has an optical system for generating an optical beam used for scanning the record carrier. The optical system comprises a radiation source 7, for instance a semiconductor laser, forming a radiation beam 8. The radiation beam is converged to a focal point by a focusing means 10, for instance a single- or multi-element objective lens. The objective lens may be moved along its optical axis, the z-axis i.e. in the directions of arrow I1, by means of a focus actuator 12. The focus actuator may be a linear motor in the form of a magnet in a magnetic coil or a magnetic coil within one or more magnets. The motion of the objective lens can shift focal point 9 through the information layers. Radiation reflected by record carrier 1 is converged by objective lens 10 via a beam separator 13 on a detection system 14. The beam separator may be a normal beam splitter, a polarizing beam splitter or a grating. Detection system 14 comprises in general several radiation sensitive detection elements. The electrical output signals of the elements are fed in a signal forming circuit 15. The circuit forms the sum of the electrical signals, which is output as the central aperture (CA) signal. The CA signal is a measure for the total amount of radiation reflected by record carrier 1. The high frequency content of the CA signal represents information encoded in the information layers.

Signal forming circuit 15 forms a radial error signal from the output signals of the detection system, which represents the distance between the centre of the focal point and the centre of a track to be followed on an information layer. A radial control system for keeping the focal point on the track is known from inter alia U.S. Pat. No. 5,321,676, and is not elaborated nor shown in the Figures.

Signal forming circuit 15 also forms such a combination of the electrical output signals of detection system 14 as to obtain a focus error (FE) signal. The value of the FE signal represents the direction and magnitude of the deviation of the focal point from the information layer being scanned. The way of combining the electrical signals, the lay-out of the detection elements and the form of beam separator 13 depends on the method used for forming the FE signal. Possible methods are the so-called astigmatic method, the Foucault method and the beam-size method, known from inter alia U.S. Pat. No. 4,023 033, European patent application nr. 0 583 036 and U.S. Pat. No. 4,724,533 respectively.

FIG. 2 shows the form of the FE signal as a function of the displacement of the focal point in the z-direction, i.e. in a direction along the optical axis of objective lens 10, for two crossings of information planes. The FE signal is substantially zero at positions 16 and 17 spaced by δ, where the focal point coincides with information layer 2 and 3 respectively. The FE signal has a positive maximum 18, 20 and a negative maximum 19, 21 on both sides of each zero-crossing 16 and 17.

In FIG. 1 the FE signal is input to a focus control circuit 22, for deriving a focus actuator (FA) signal in response to the FE signal and supplying said drive signal to focus actuator 12 to cause the actuator to maintain focal point 9 substantially on the information layer to be scanned. FIG. 3 shows schematically the lay-out of focus control circuit 22. The FE signal is input in a filter circuit 23, comprising a cross-over filter and, possibly, an amplifier. The output signal of the filter circuit is used as input for three circuits. The first circuit is a linear amplifier 24 for obtaining a proportional focus control action. The second circuit is a differentiator 25 for obtaining a differentiating focus control action. The third circuit is an integrator 26 for obtaining an integrating focus control action. The output signals of the three circuits are combined in an adder circuit 27 to produce the FA signal for focus actuator 12. Integrator 26 has an additional input signal from a ramp-increment circuit 28. This circuit can generate a constant level signal, which, when input on the integrator causes the FC signal level to increase in the form of a ramp. The inputs of linear amplifier 24 and differentiator 25 and the two inputs of the integrator 26 can be interrupted by switches 29, 30, 31 and 32 respectively, arranged in the signal paths to the inputs. The switches are controlled by a loop controller 33 in dependence on a loop control (LC) signal. The LC signal may comprise a series of signals transmitted in parallel. The opening and closing of the switches modifies the characteristics of focus control circuit 22. The actual operation of the control will be explained below. Integrator 26 is preferably switched on and off at its one or more inputs instead of at its output. Switching at the output entails removing or adding to the FA signal the Output of the integrator,which may have a significant level, thereby disturbing the focus control. The embodiment of control circuit 22 shown in FIG. 3 controls the motion of the focus actuator during the layer jump by means of the regularly increasing output level of integrator 26. In an alternative embodiment the motion of the focus actuator is determined by a relatively short pulse supplied to adder circuit 27, after which the actuator moves without further powering. The pulse may, for example, have a duration of 1 ms, after which the actuator continues to move 2 ms, giving a total time of about 3 ms to move the focal point from one layer to another layer over a distance of 25 μm.

The combination of detection system 14, signal forming circuit 15, focus control circuit 22, focus actuator 12 and focusing means 10 forms a feedback loop for keeping focal point 9 on an information layer to be scanned. Linear amplifier 24, differentiator 25 and integrator 26 form three branches of the feedback loop.

The binary LC signal in FIG. 1 is generated by a first controller 34. FIG. 4 shows an embodiment of the controller. The LC signal assumes a first logical value after receiving a layerjump (LJ) command for changing the scanning from one information layer to another one. The LC signal assumes a second logical value after receiving a transition in a binary close (CL) signal. The LC signal modifies the characteristics of the feedback loop via loop controller 33 the moment the command is received to change information layers. The signal restores the characteristics of the feedback loop when a transition in the CL signal is detected and the focal point is close to the information layer where the scanning is to be continued. A circuit 35, possibly a set-reset flip-flop, modifies the LJ signal and CL signal into the LC signal.

First controller 34 also comprises a jump control signal generator 36 for supplying a jump (JU) signal to the focus control circuit in synchronism with the LC signal for making focal point 9 move in the direction of the information layer to be scanned. On receipt of the LJ command, the generator outputs the JU signal to focus control circuit 22. This signal closes switch 32 of the focus control circuit, upon which ramp-increment circuit 28 sends a constant level signal of positive or negative polarity to integrator 26, causing the focus actuator to move over a distance and in a direction indicated by the constant level signal and determined by the number of information layers to jump and the direction of the jump.

The CL signal used as input for first controller 34 is generated in a second control circuit 37 in response to the FE signal and the CA signal. The CA signal is used when the focal point is moved through the entrance face towards the information layers. When changing the focal point between information layers, the CA signal need not be used anymore, and the FE signal will be used to generate the CL signal. FIG. 5 shows an embodiment of the second controller. The CA signal or a low-pass filtered CA signal is input to a comparator 38, which gives a binary '1' output signal when the CA signal exceeds a predetermined CA preset value CAp. The value of CAp is set such that it is higher than the CA signal due to entrance face 6 and lower than the CA signal due to an information layer. The FE signal is rectified in a rectifier 39. A comparator 40 compares the output of rectifier 39 with a predetermined FE preset value FEp. The value of FEp is set such that it is higher than the peak value of the noise in the FE signal and smaller than the maximum value of the S-curve. The outputs of comparator 38 and 40 are combined in an AND circuit 41, which gives a binary '1' output signal only if both its inputs are '1'. According to the invention the output of comparator 40 is also connected to the input of a counter 42, which counts the number of '0' to '1' transitions at its input after a layer-jump command has been given. Thus the counter counts the number of upward crossings of the preset level FEp by the FE signal. A comparator 43 compares the output of counter 42 with a preset number 2N, where N is the absolute difference in ordinal number of the information layers between which the layer jump is made. When the number of transitions counted by counter 42 equals the preset number, comparator 43 outputs a binary '1' signal. A switch 44 connects either the output of AND circuit 41 or the output of comparator 43 to the CL-signal conductor, depending on whether focal point 9 is to be focused on information layer 2 after crossing entrance surface 6, or a focus jump is made between information layers. The CL-signal conductor connects the CL signal to first controller 34. The combination of rectifier 39, comparator 40, counter 42 and comparator 43 forms an inhibitor, which inhibits the occurrence of a transition in the C1 signal as long as the required number of upward crossings in the FE signal have not yet been detected.

The operation of the control circuits will now be described with reference to the circuit diagrams in FIGS. 1, 3, 4 and 5 and the diagrams in FIGS. 2 and 6.

At the start of a scanning session, a layer-jump (LJ) command is given to first controller 34, which causes jump control signal generator 36 to send a jump pulse to focus control circuit 22. The subsequent closing of switch 32 causes the focus actuator (FA) signal to ramp up or down, depending oil the sign of the signal generated by ramp-increment circuit 28. Circuit 35 will output an LC signal, opening switches 29, 30 and 31, thereby opening the feedback loop, of which focus control circuit 22 forms a part. The values of the FE and CA signals during the ramp are shown in FIG. 6 as a function of the displacement z along the optical axis of the objective lens 10. Second controller 37 monitors these values and acts when both signals cross the appropriate preset values. The FE signal around position 45 of the entrance surface is equally large as the FE signal around the positions 46, 47 and 48 of information layers 2, 3 and 4 respectively, because signal forming circuit 15 normalizes the FE signal, making it independent of the reflectivity of a surface or layer. Since the FE signal of the entrance surface crosses the FEp level, comparator 40 will output a '1' signal. However, the not-normalized CA signal remains below the CAp level because of the low reflectivity of the entrance surface. Comparator 38 will not output a '1' signal, and, since switch 44 connect the CL signal to the output of AND circuit 41, no transition in the CL signal is generated. Hence, the feedback loop remains open, and the ramp continues. When the focal point approaches position 46, where it coincides with information layer 2, the CA signal crosses the CAp level and, somewhat later, the FE signal crosses the FEp level at position 49. AND circuit 41 will then output a '1' signal. Because switch 44 connects the output of AND circuit 41 to the CL conductor during the start phase of a scanning session, the CL signal is transmitted to first controller 34, where it resets circuit 35. The value of the LC signal drops to '0', closing switches 29, 30 and 31, thereby closing the feedback loop. At the same time switch 32 is opened by circuit 33, terminating the ramp. Focus control circuit 22 will now control the position of focal point 9 such that it moves from position 49 to 46, where it stays locked. A more detailed description of the initial focusing step may be found in U.S. Pat. No. 5,189,293.

When during a scanning session the focal point must jump layers, for instance from information layer 2 to information layer 3, i.e. from position 46 to position 47 in FIG. 6, the above described, known method used for initial focusing cannot be used. If the known method were to be applied, level crossings of both the CA and FE signals would be monitored. Since the comparator checks the absolute value of the FE signal, comparator 40 will detect an upward crossing at position 50. The CA signals of the information layers overlap to such an extent, that the CA signal remains above the CAp preset level during layer jumps. Hence, comparator 38 will also output a '1' signal, causing AND circuit 41 to output a '1' signal. In the known method, switch 44 connects the output of AND circuit 41 with the CL conductor, so that the signal CL is set to '1', causing the feedback loop to be closed. In case the actuator does not move sufficiently fast at position 50, the focus control will pull the focal point back to position 46. In case the actuator moves fast enough, the focal point will continue to move in the direction of position 47. However, around the zero-crossing of the FE signal at position 51, where the focal point is half way the distance between layers 2 and 3, the actuator will acquire a high speed due to the effect of the positive slope of the FE signal on the differentiator of focus control circuit 22. The high speed makes capture of the focal point at position 47 uncertain.

The focus control according to the invention solves this problem by a more advanced monitoring of the rectified FE signal. When performing the layer jump from layer 2 to 3, counter 42 counts the number of upward crossing of level FEp by the rectified FE signal. When this number equals the preset value 2 for this jump, which occurs at position 52, comparator 43 issues a '1' signal. Since switch 44 connects the output of comparator 43 to the CL conductor when performing layer jumps, the C1 signal will be set to '1', which will close the feedback loop. The actuator will then travel from position 52 to position 47 without incurring too much speed, thereby ensuring a proper capture of the focal point on information layer 3. The focus control according to the invention has thereby passed the zero-crossing at position 51 while temporarily opening the feedback loop.

When the focal point must jump N layers, the preset value of comparator 43 will be set to 2N. The second controller must then detect 2N upward crossings of the rectified FE signal before the feedback loop will be closed. During this time the JU signal ensures that the actuator continues moving towards the designated information layer at a desired speed. The JU signal may impart any speed profile on the actuator movement, such as an initial acceleration, followed by a constant velocity movement and terminated by a deceleration.

In another embodiment of the optical scanning device according to the invention, the modification of the feedback loop around zero-crossing 51 comprises a change in the differentiator of the feedback loop. FIG. 7 shows the diagram of an adjustable differentiator 25', which, in this embodiment, replaces differentiator 25. The input signal of the differentiator is connected to a first input of an operational amplifier 51 via a capacitor 54. The second input of the operational amplifier is connected to earth. Two resistors 55 and 56 are connected to the first input. A switch 57 allows to connect either resistor 55 or resistor 56 to the output. Different values of the resistor provide different strengths of the differentiating action. The switch is operated via circuit 33. When the focus is locked on an information layer, the switch will be in such a position that a maximum differentiating action is obtained. During a focus jump, the switch will be in such a position that a smaller differentiating action is obtained, thereby avoiding that the actuator acquires too much speed when crossing positions like 51. During initial focusing, the feedback loop may opened by switches 29, 30, 31 and 32 as described above.

The embodiment of the second controller as shown in FIG. 5 generates the '1' CL signal at the upward crossing of the FE signal at position 52. If a short braking distance between closing of the loop and capture of the focal point on the designated information layer suffices, the '1' CL signal may also be given at position 47, i.e. at the first zero-crossing of the FE signal after the $2N^{th}$ upward crossing. A second embodiment of the second controller having this feature is shown in FIG. 8. The elements used for the initial focusing are identical for the first and second embodiment of the second controller. The FE signal is fed in a zero detector 58, which outputs a logical '1' value during a predetermined time after a zero-crossing of its input signal has been detected. The output signal of zero detector 58 is connected to an input of an AND circuit 59, which has the output signal of comparator 43 at its other input. The output of AND circuit 59 is connected to the CL conductor via switch 44 when the scanning device makes layer jumps. A '1' value at the output of zero detector 58 only result in a '1' value of the CL signal if the output of comparator 43 is also '1'. In other words, a transition to '1' of the CL signal will only occur at the first zero-crossing of the FE signal after the $2N^{th}$ upward crossing of the FE signal. The inhibitor is formed by elements 39, 40, 42, 43, 58 and 59.

In a third embodiment of the second controller zero detector 58 is preceded by a differentiator 60, shown by dashed lines in FIG. 8. The combination of circuits 58 and 60 detects zero-crossings in the derivative of the FE signal. The detection of such a zero after the $2N^{th}$ upward crossing results in a transition to a '1' value of the CL signal. In FIG. 6 this means that, when the upward crossing at position 52 has been detected, the CL signal will go to '1' at position 60, i.e. at the maximum value of the FE signal.

FIG. 9 shows a fourth embodiment of the second controller. The LJ command is input to a timer 61, which outputs a binary timing signal. In this embodiment the inhibitor comprises only the timer. When the U command indicates that a layer jump must be performed, the timer issues a '0' timing signal. After a predetermined time the timing signal makes a transition to the '1' value. The duration of the predetermined time is set by the number of information layers the focal point has to jump, the distance between the layers and the speed imposed on actuator 12. At the end of the predetermined time the feedback loop closes. The focal point must then be close enough to the designated information layer to capture properly. In this embodiment the timer forms the inhibitor which assures that the feedback loop is not closed in a region around a zero crossing of the FE signal which does not pertain to an information layer, such as for example zero crossing 51 in FIG. 6.

FIG. 10 shows a part of a fifth embodiment of the second controller, in particular the inhibitor. The elements used for the initial focusing are identical for the first and fourth embodiment of the second controller. The FE signal is input at a zero detector 62, which outputs a '1' signal after detecting a zero crossing of the FE signal. This output is combined with the timing signal from timer 61 in an AND circuit 63, the output of which is connected to switch 44. A transition of the CL signal to '1' occurs the moment zero detector 62 detects the first zero-crossing of the FE signal after the predetermined time of timer 61 has lapsed. At the end of the predetermined time the focal point must be located before the zero-crossing of the designated information layer, so that the subsequently detected zero-crossing causes the closing of the feedback loop. In stead of zero-detector 62, a comparator like comparator 40 may be used in order to close the feedback loop at a predetermined value of the FE signal unequal to zero. The fifth embodiment of the second controller makes the scanning device less sensitive to inaccuracies in the travel of the actuator during the predetermined time, because the loop always closes at a well defined position, irrespective of the position of the focal point at the end of the predetermined time.

A sixth embodiment of the second controller comprises a differentiator 64, shown by dashed lines in FIG. 10, before zero detector 62. Analogous to the third embodiment of the second controller, the transition of the CL signal to '1' occurs when zero detector 62 detects the first zero crossing of the derivative of the FE signal after lapse of the predetermined time. The sixth embodiment provides more braking distance than the fifth embodiment.

An even longer braking distance may be obtained, when the '1' transition of the CL signal occurs after the first upward zero-crossing of the FE signal after lapse of the predetermined time. For the implementation a combination of the timing signal and the output of comparator 40 in FIG. 5 is required. The first and second controller may be integrated in a single electronic circuit. When the CA and FE signals are processed digitally, the two controllers and the focus control circuit may be advantageously combined in a single electronic circuit.

Although the disclosure of the invention has been made with reference to a scanning device for scanning optical record carriers, a person skilled in the art will readily understand that the invention is not limited to such a device, but encompasses scanning devices for any kind of object having superjacent layers comprising some kind of information. An example is a scanning device for investigating superjacent layers of an integrated semiconductor circuit by radiation having a wavelength for which the layers are at least partly transparent. The device scans the different layers forming the circuit, while the information read from the layers is the structure of these layers.

What is claimed is:

1. A focus control system for an optical scanning apparatus for scanning an optical record carrier having multiple superjacent information layers, the optical system comprising:

a focus error detector which derives a focus error signal indicating the direction and distance between a focal point and one of the information layers being scanned;

a focus control circuit which derives a focus actuator drive signal in response to the focus error signal and supplies the drive signal to a focus actuator to maintain the focus point substantially on the information layer being scanned;

first controller means for generating a binary loop control signal which assumes a first logical value controlling a modification of the functionality of the focus control circuit after receiving a layer-jump command signal for changing the scanning from a first to a second information layer and a second logical value controlling the restoring of the functionality in response to a loop close signal; and a second controller means for generating the loop close signal in response to a prescribed characteristic of the focus error signal such that the generation of the loop error signal is inhibited in an interval around a zero-crossing of the focus error signal when the focal point is at a position in between subsequent information layers.

2. The focus control system of claim 1, in which the modification of the functionality includes changing from a closed loop mode of operation to an open loop mode of operation of the focus control circuit.

3. The focus control system of claim 1, in which the modification of the functionality includes altering an amplification factor of the focus control circuit.

4. The focus control system of claim 1, in which the modification of the functionality includes interrupting operation of a proportional branch of a PID controller of the focus control circuit.

5. The focus control system of claim 1, in which the modification of the functionality includes interrupting operation of a differentiating branch of a PID controller of the focus control circuit.

6. The focus control system of claim 1, in which the modification of the functionality includes interrupting an input signal at an input of an integrated branch of a pid controller of the focus control circuit.

7. The focus control system of claim 6, in which a further modification of the functionality includes a pulse generator supplying a pulse to an input of the integrating branch.

8. The focus control system of claim 1, in which the prescribed characteristic of the focus error signal is an equivalent of the $2N^{th}$ upward crossing of a preset level by the absolute value of the focus error signal, where N represents one plus the number of information layers between the first information layer and the second information layer.

9. The focus control system of claim 1, in which the prescribed characteristic of the focus error signal is a first zero-crossing of the focus error signal occurring after a $2N^{th}$ upward crossing of a preset level by the absolute value of the focus error signal, where N represents one plus the number of information layers between the first information layer and the second information layer.

10. The focus control system of claim 1, in which the prescribed characteristic of the focus error signal is a first zero-crossing of a derivative of the focus error signal occurring after a $2N^{th}$ upward crossing of a preset level by the absolute value of the focus error signal, where N represents one plus the number of information layers between the first information layer and the second information layer.

11. The focus control system of claim 1, in which the system further comprises a timer for generating a timing signal for a time period which depends on a number N, and the second controller inhibits the generation of the loop close signal during the time period, where N represents one plus the number of information layers between the first information layer and the second information layer.

12. The focus control system of claim 1, in which the prescribed characteristic of the focus error signal is a first zero-crossing of the focus error signal after the time period.

13. The focus control system of claim 1, in which the prescribed characteristic of the focus error signal is a first zero-crossing of a derivative of the focus error signal after the time period.

14. The focus control system of claim 1, in which the loop close signal is generated substantially at or after the occurrence of the prescribed characteristic of the focus error signal.

15. An optical scanning apparatus for scanning an optical record carrier with a plurality of superjacent information layers, comprising:

an optical system of focusing a radiation beam on a focal point;

a focus actuator for controlling the optical system to selectively shift the focal point in a direction perpendicular to the information layers;

a focus error detector which derives a focus error signal indicating the direction and distance between the focal point and one of the information layers being scanned;

a focus control circuit which derives a focus actuator drive signal in response to the focus error signal and supplies the drive signal to the focus actuator to maintain the focus point substantially on the information layer being scanned;

first controller means for generating a binary loop control signal which assumes a first logical value controlling a modification of the functionality of the focus control circuit after receiving a layer-jump command signal for changing the scanning from a first to a second information layer and a second logical value controlling the restoring of the functionality in response to a loop close signal; and a second controller means for generating the loop close signal in response to a prescribed characteristic of the focus error signal such that the generation of the loop error signal is inhibited in an interval around a zero-crossing of the focus error signal when the focal point is at a position in between subsequent information layers.

16. A method for scanning an optical record carrier having multiple superjacent information layers, comprising the steps of:

converging a radiation beam to a focal point;

deriving a focal error signal from radiation coming from the record carrier and indicating the direction and distance between the focal point and a first layer being scanned;

using the focus error signal as an input to a feedback loop for controlling the position of the focal point to keep it substantially on the first layer being scanned;

changing the position of the focal point from the first layer to a second layer to be scanned;

controlling the position of the focal point to keep it substantially on the second layer being scanned;

and in which changing the position of the focal point includes:

energizing a focus actuator;

monitoring the focus error signal during the change in position;

modifying the characteristics of a feedback loop before a zero-crossing of the focus error signal between the subsequent zero-crossings corresponding to the layers; and restoring the characteristics of the feedback loop after the zero-crossing in response to the focus error signal.

* * * * *